April 25, 1933.  P. LETRILLIART  1,906,164
ASYNCHRONOUS ELECTRICAL MACHINE
Filed Nov. 25, 1929   3 Sheets-Sheet 1
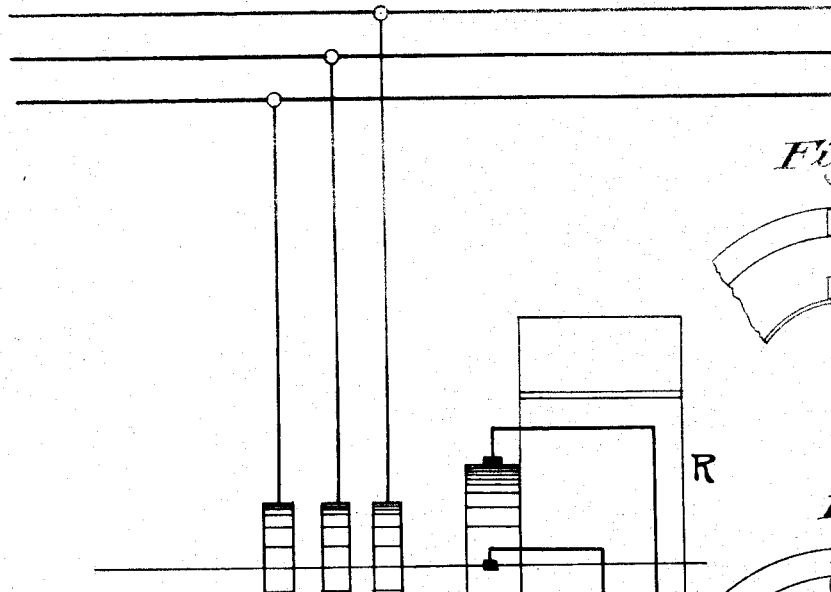
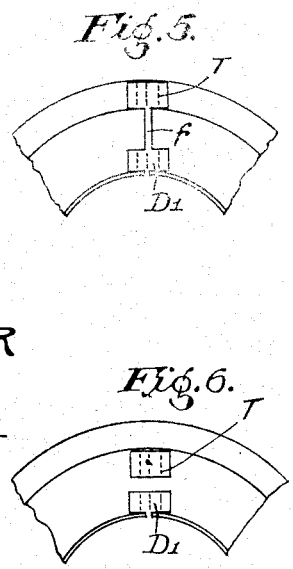
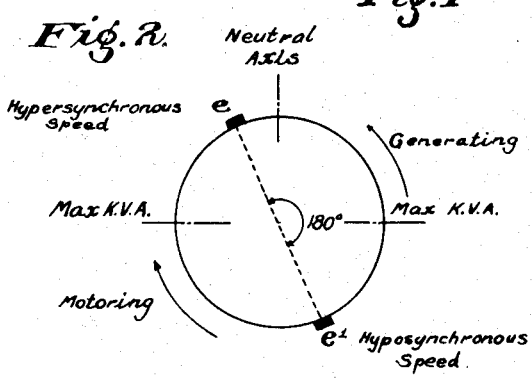
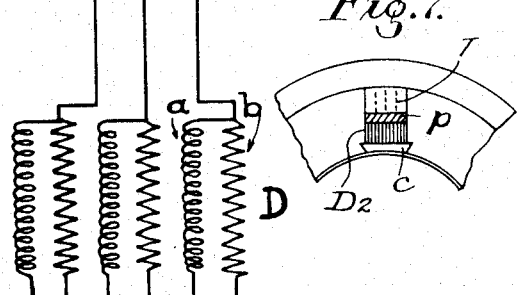

April 25, 1933.  P. LETRILLIART  1,906,164
ASYNCHRONOUS ELECTRICAL MACHINE
Filed Nov. 25, 1929   3 Sheets-Sheet 3

Inventor:—
Pierre Letrilliart,
By:— Smith, Michael & Gardiner,
Attorneys.

Patented Apr. 25, 1933

1,906,164

UNITED STATES PATENT OFFICE

PIERRE LETRILLIART, OF PARIS, FRANCE, ASSIGNOR TO FORGES & ATELIERS DE CONSTRUCTIONS ELECTRIQUES DE JEUMONT, OF PARIS, FRANCE, A FRENCH SOCIÉTÉ ANONYME

ASYNCHRONOUS ELECTRICAL MACHINE

Application filed November 25, 1929, Serial No. 409,643, and in France November 29, 1928.

This invention relates to the starting of asynchronous electrical machines.

It has already been proposed in order to obtain the automatic starting of induction motors, without taking excessive current, to insert in each phase of the secondary a low resistance inductance in parallel with a pure ohmic resistance. As the resistance and the inductance remain constantly in circuit, it follows that during running, the overload, power factor and efficiency are considerably lowered, which fact has led to the abandonment of this arrangement.

The present invention has for its object to provide for the automatic starting of asynchronous electrical machines without diminishing the overload capacity and practically without affecting the power factor and the efficiency in normal running.

It is applicable to induction machines in which the secondary is closed upon a commutator at the brushes of which there is maintained a substantially constant auxiliary or compensating voltage. These machines comprise two main forms, one being an auto-compensated single machine, as described in the patent specification No. 1,668,366, and the other a group compensated by a frequency changer connected in cascade, the latter form having very long been known.

The present invention consists in the application to these machines of a starter formed by a resistance and an inductance in parallel, inserted in the secondary of a machine of which the no-load speed is selected in such a way that the maximum torque corresponds to the speed of synchronism.

The invention also comprises a particular choice or selection of the auxiliary or compensating voltage at the commutator, this voltage being selected in magnitude and in phase, in such a way that at no load the machine or group operates as a motor slightly above synchronism, and as a generator below synchronism, in order that the maximum torque shall correspond substantially in each case to the speed of synchronism.

Figure 1 of the accompanying drawings represents diagrammatically an arrangement for the automatic starting of asynchronous machines in accordance with the invention.

Figure 2 is a diagram representing the commutator of a two-pole machine, two alternative positions for the brush leading to one of the stator phase windings being indicated.

Figures 5, 6 and 7 represent three examples of the arrangement of stator windings in the slots.

Referring to Figure 1,—

R is the rotor of the asynchronous machine, carrying the primary winding connected by the slip rings B to the external network, and also the compensating winding connected to the commutator.

S is the stator, carrying the secondary winding closed upon the compensating winding through stationary brushes on the commutator.

D is the starter, constituted by an inductance $a$ in parallel with a resistance $b$, these being inserted in each phase of the secondary.

It will be understood that the inductance and the resistance in parallel have then practically no influence at all upon the characteristics under load, for the current passes wholly into the inductance coil at the low frequency corresponding to the slip, which may in fact be negative at hypersynchronous speeds, in which case the secondary circuit frequency falls as the load is increased; the slip and therefore the secondary circuit frequency become substantially nil at overload, since the maximum torque corresponds approximately to the speed of synchronism.

Figure 9:
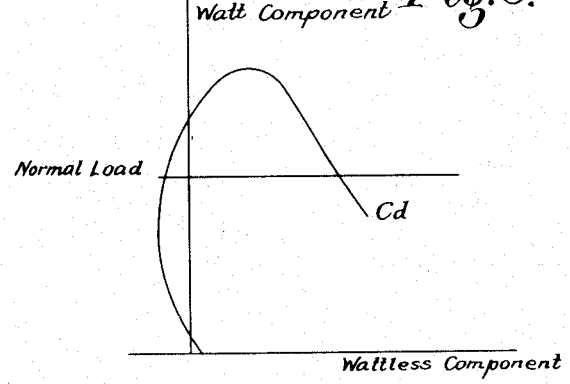
Figure 9 is a diagram of the starting current corresponding to Figure 8.
Figure 10:
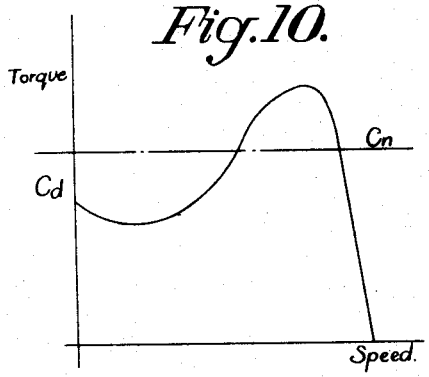

During the starting of the machine as a motor, it is possible to obtain with a low consumption of current the value and curve desired for the torque by suitably selecting the values of the resistance and of the inductance. For example, there can be obtained (see Fig. 8) a starting torque $Cd$ of the order of three-quarters of the normal torque $Cn$, with a starting current at the point $Cd$ (Fig. 9) less than twice the normal current at the point $Cn$. These values can be modified by adjusting the resistance $b$ and the inductance $a$ of the starter and if necessary by varying the voltage induced in the commutator winding; in this way it is possible to obtain as indicated in Fig. 10 or on the contrary to obviate the presence of a dip in the ascendant part of the curve of Fig. 8, giving the torque as a function of the speed, during starting.

The machines will be constructed in such a way that the power factor under load shall approximate to unity with the starting arrangement in circuit.

It will be possible in certain cases to combine the resistance and the inductance in a single apparatus by constructing the magnetic circuit of the inductance in solid metal. The Foucault currents generated in the solid magnetic circuit create losses which are the equivalent of the $I^2R$ losses (Joule's law) produced in the resistance placed in parallel with the inductance in the arrangement illustrated in Fig. 1.

This method or arrangement for starting can be applied in particular:

(1) to motors:

The motor will operate at no load at a slightly hyper-synchronous speed. In case of voltage failure in the supply system, the motor will be automatically ready for a fresh start.

(2) to asynchronous generators:

The generator will operate at no load at a slightly hypo-synchronous speed.

Figure 11:
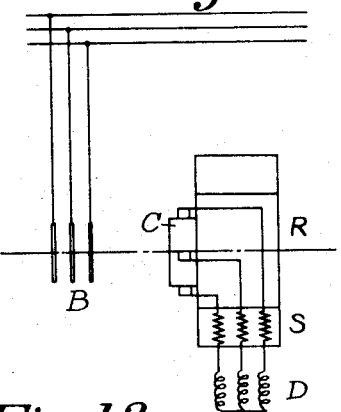
Figure 11 is a diagram illustrating a modification of Figure 1, applicable in the case of an asynchronous generator.

The importance of the arrangement which forms the subject of the present invention for the starting up of automatic hydraulic generating stations will be understood; it is sufficient to connect the primary to the supply system or network and to open the inlet valve of the turbine. Automatically the generator will feed the supply system without any sudden rush as soon as the speed passes through pseudo-synchronism. In this case the starting arrangement (resistance and inductance in parallel) may be reduced to inductance coils only, as shown in Fig. 11, the resistances being suppressed; the generator being driven by the turbine does not need to develop a driving torque at the moment of starting.

(3) to the regenerative running of motors below synchronism.

A method already proposed for the lowering of loads consists in making the induction motor run above synchronism so as to regenerate into the supply network, but this method has the disadvantage of requiring complicated equipment.

The difficulty is as follows:—At starting the torque of the asynchronous motor adds itself to the torque due to the load. The resistance inserted in the secondary has for its main object to limit the rush of current at starting. It is necessary to reduce this resistance in proportion to the speeding up, in such a way that it shall be short-circuited when the machine reaches synchronism. If the operation is not carried out correctly there is risk of stalling or packing up. The degree of safety is then a function of the sensitiveness and the robustness of the equipment.

The starter (resistance and inductance in parallel) applied to the auto-compensated motor or to the frequency-changer motor group, allows of lowering loads with regeneration below synchronism without any rheostat equipment and with increased security. The machine is regulated in such a way that its no-load speed is lower than synchronism by a few revolutions, and that its maximum torque as generator corresponds to the speed of synchronism. In proportion to the speeding up, the intensity of the current in the resistance will diminish, becoming substantially nil at the moment when the generator works at the maximum torque.

Figure 12:
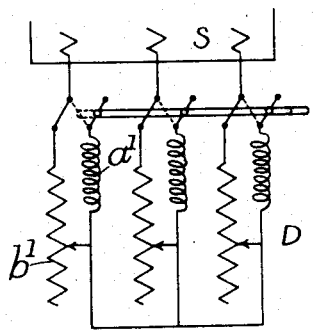
Figure 12 illustrates a switching arrangement for the control of a hoisting motor with regenerative braking in the direction of lowering.

It is possible that an adjustment of the torque as a function of the speed may be necessary during the lifting of the load, and that for this purpose, there will be utilized an ordinary rheostat $b^1$ with variable taps as illustrated in Fig. 12; the resistance of the latter can then be employed, either as a whole or in part, in parallel with the inductance $a^1$ for lowering the loads with regenerative braking. It is sufficient that the operating handle shall switch in the inductance while producing the reversal of the primary revolving field and suitably shifting the brushes in the known manner.

The arrangement which forms the subject of the present invention has moreover the advantage of ensuring a high maximum torque for raising and for lowering, greater than that which a similar ordinary asynchronous motor of the same power would have. As a motor, the machine works with a brush setting upon the commutator corresponding to a hyper-synchronous no-load speed, and as a generator with a brush setting corresponding to a hypo-synchronous no-load speed.

The improved arrangement eliminates the risk of non-operation of the mechanical device for short-circuiting the secondary, controlled by speed or frequency. It ensures a high maximum torque as a generator and therefore renders more remote the danger limit of the machine getting out of step.

The customary shifting of the brushes upon the commutator when reversing the motor for lowering the load with regenerative braking can be obviated by inverting the respective leads to and from the secondary winding of the asynchronous machine as can be seen on referring to the diagram in Figure 2, relative to a two-pole machine. In this diagram, the brush leading to one phase winding on the stator is shown in two alternative positions, viz.

(1) the position $e$ near the top of the diagram, which represents the brush setting with the machine running in the clockwise direction as a motor, with $\cos \phi = 1$, at hyper-synchronous no-load speed; this position is about 20 to 30 electrical degrees behind the neutral axis, i. e. the position of the brushes at which the flux produced by the secondary winding and the flux produced by the compensating winding connected to the commutator would have the same direction and would act in conjunction.

(2) the position $e^1$ near the bottom of the diagram, which represents the brush setting with the machine working as a generator and running in the opposite direction (i. e. counterclockwise) for regenerative lowering of the load, with $\cos \phi = 1$, at hypo-synchronous no-load speed; this position is about 150 to 160 electrical degrees in advance of the neutral axis, according to the new direction of running.

The two points "max. K. V. A." correspond to the brush settings for the respective directions of rotation, at which the magnetizing power (K. V. A.) taken or furnished by the machine passes through maximum values.

Figure 13:
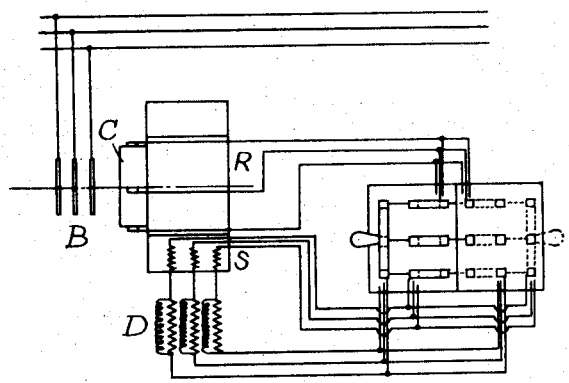
Figure 13 represents diagrammatically a motor in accordance with the invention, adapted for regenerative reversal.

It will be clear from the diagram that in order to change over from running as a motor with $\cos \phi = 1$ and at hyper-synchronous speed, to regenerative braking, running in the opposite direction, with $\cos \phi = 1$ and at hyposynchronous speed, it would be necessary to shift the brushes through 180 electrical degrees (from $e$ to $e^1$) upon the commutator. But that same result can be secured, obviating the need for shifting the brushes and leaving them to occupy their definite stationary position relative to the secondary part of the machine, by connecting the brush leads to the opposite ends of the secondary winding, or of the group formed by the secondary winding and the starter, as illustrated in Fig. 13, the three ends of the secondary which were previously connected to the brushes being then in the former case connected to the starter phases or in the latter case joined together to form the neutral or star point.

There may also be combined in a single machine the compensated motor and the starter (resistance and inductance in parallel) to form a compensated machine with automatic starting, in which the torque can attain .75 times the normal torque with a current equal to 1.5 times the normal current. The power factor approximates to unity at all loads and the maximum torque is of the order of 1.6 times the normal torque. The slip under load is no greater than that of a normal motor of the same power.

Figure 3:
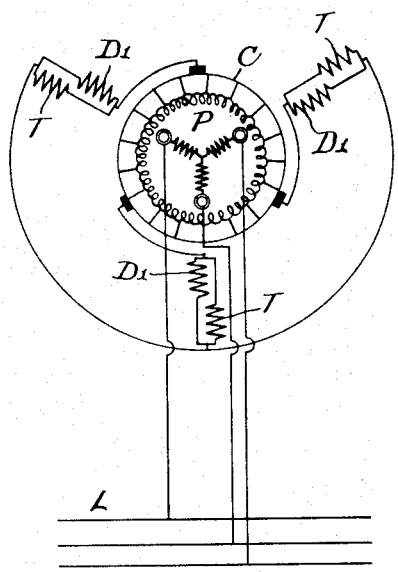
Figures 3 and 4 are diagrams representing other arrangements of the windings upon asynchronous machines in accordance with the invention.

The double-cage asynchronous motor of the Boucherot type can be arranged for starting automatically with any value of the torque between .5 and 1.5 times the normal torque, but it is difficult to obtain satisfactory conditions of overload, power factor and efficiency, if the motor is to take a moderate current at starting. This drawback is remedied by combining in a single machine the auto-compensated motor with rotor feed, forming the subject matter of the United States Patent 1,668,366, and the Boucherot type double cage motor in the general form of arrangement represented in Fig. 3 of the drawings:

The rotor $R_1$ carries two windings P F; P is an ordinary three-phase winding connected to three rings B fed from the supply system L; F is a closed winding, like a continuous current machine winding, of whole or shortened pitch, connected to the commutator C.

The stator $S_1$ carries two windings arranged in two superposed slots united or not by a slit. The numbers of slots of the two windings may moreover be different. These two windings, the starting winding $D_1$ of high resistance placed near the air gap and the working winding T sunk in the iron are connected in parallel. The whole is connected on one side to the commutator C by the brushes $b^1$ $b^2$ $b^3$, and forms a neutral point on the other side.

Figure 14:
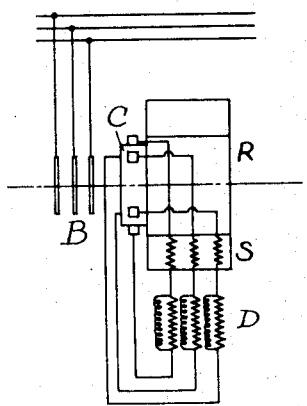
Figure 14 illustrates a modification of the arrangement shown in Figure 1, provided with separate connections from both extremities of the phase windings to the commutator brushes.

The two extremities of these windings might be connected to the commutator C as shown in Fig. 14. There would then be required six brushes; the two ends of each phase winding would be connected to two brushes diametrically opposite, and there would be no neutral point.

Figure 4:
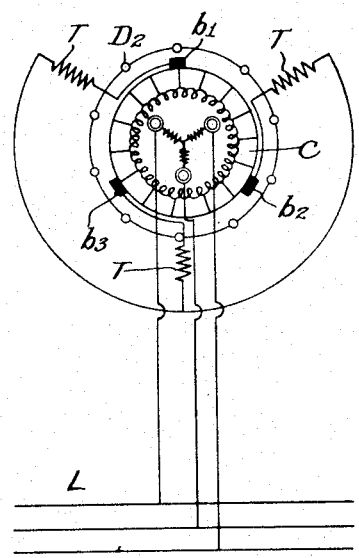

In the particular mode of construction represented in Figure 4, the secondary windings are independent; the working winding T is alone connected to the commutator C, the starting winding being closed in short circuit and constructed in the form of a squirrel cage winding $D_2$.

In the example of construction of the stator winding represented in Figure 5, the two slots are connected by a very narrow slit or isthmus $f$.

In the modification shown in Figure 6, the two slots are very close together and completely independent.

In the modification represented in Figure 7, the two windings are located in the same slot; the working winding T made of copper is placed at the bottom and the starting winding $D_2$ is situated near the air gap, being separated from the winding T by a bundle of stampings $p$ and the slot being closed by a magnetic wedge $c$.

The working winding T is always made in the form of a wound winding, whereas the starting winding may be wound (as $D_1$ in Fig. 3) or on the contrary made in the form of a squirrel cage (as $D_2$ in Fig. 4) with magnetic metal bars not insulated from the stampings but insulated from the winding T which is alone connected to the brushes of the commutator; the two windings are thus electrically independent, that is, not connected together conductively but closely coupled magnetically by magnetic induction, which provides the equivalent of parallel connection for the starting. In both cases the slots are open and the operation of winding the machine is very simple.

At starting, the motor behaves almost as if there were only the high resistance inner winding $D_2$; the motor therefore starts with the desired torque. The reactance of the winding T is very high and the intensity of the current which traverses it is negligible.

At full speed, the motor behaves almost as if the winding T alone existed; the latter being of low resistance, the slip is small. At intermediate speeds, two windings T and $D_1$ participate in the production of the torque.

Figure 8:
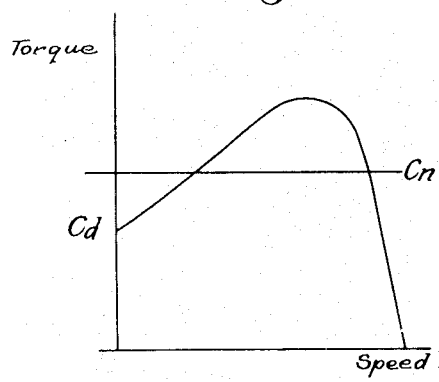
Figures 8 and 10 are two diagrams showing the relation of torque and speed, during starting, of a motor according to the invention, with two different adjustments of the starting impedance.

The resulting torque as a function of the speed has the characteristic shown by the curve in Figure 8.

The superiority of the machine arranged in accordance with the invention over the ordinary double cage motor arises from the presence of the commutator which allows with equal torque at starting, of limiting the intensity of current consumed to a much lower value, while retaining a power factor approximating to unity as well as a suitable maximum torque and efficiency.

The brushes may be shifted upon the commutator in order to give the necessary phasing to the voltage injected into the secondary member.

Figure 15:
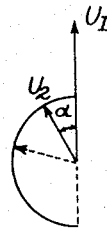
Figure 15 is a diagram, showing the variation of the phase of the secondary voltage in accordance with the shifting of the brushes upon the commutator.

Fig. 15 shows the variation of the phase of the secondary voltage as a function of the shifting of the brushes upon the commutator, $U_1$ representing the line voltage, $\alpha$ the angle of the brush shift, and $U_2$ the corresponding phasing of the secondary voltage in relation to the line voltage.

The calculation of these motors is analogous to that of ordinary double cage motors. The diagram of the intensity of current with constant voltage at the terminals, has the characteristic form indicated by the curve in Figure 9.

This machine can be utilized:

(1) as a motor.
The short circuit current being of the order 1.5 times the normal current, there is no fear of accident. The no-load speed is slightly hyper-synchronous.

(2) as a generator.
When thus employed the machine presents great value for the equipment of automatic hydraulic generating stations. The method of operation is identical with that described with reference to Figures 1 and 2. The high resistance starting winding may be suppressed like the starter resistance, mentioned in connection with Fig. 11; the stator then carries only the working winding T sunk deep in the iron. The no-load speed is slightly hypo-synchronous.

(3) in regenerative working below synchronism, in accordance with the method of operation described with regard to Figures 1 and 2.

(4) as a power-factor compensator with automatic starting, with a suitable setting of the brushes. The intensity of the current taken at starting can be reduced to a value lower than the normal intensity, the torque necessary for starting being relatively small.

What I claim is:—

1. An automatically starting asynchronous electrical machine, comprising a primary winding, a secondary winding, a compensating winding, a commutator connected to said compensating winding, with its brushes connected to said secondary winding, and a starting impedance co-operating with said secondary winding, said starting impedance consisting of polyphase resistance and polyphase inductance, and the starting inductance being rendered negligible in normal running by the effect of said commutator.

2. An asynchronous electric motor, comprising a primary rotor winding, a secondary stator winding, a compensating winding upon the rotor, a rotary commutator to which said compensating winding is connected, said commutator having its brushes connected to said secondary winding, and a starting impedance co-operating with said secondary winding, said secondary winding being normally connected directly at one end to said commutator brushes but being inversely connectible through said starting impedance for regenerative braking of the motor when driven in the opposite direction of rotation.

3. An asynchronous motor, comprising a primary winding, a compensating winding, said primary and compensating winding mounted upon one of the two relatively movable members of the motor, secondary windings mounted upon the other member of the motor, said secondary windings consisting of two wound windings connected in parallel, one of said secondary windings being of high resistance and placed near the air gap, the other of said secondary windings being of low resistance and sunk in the iron to produce high self-induction, a commutator connected to said compensating winding, and brushes upon said commutator connected to said secondary windings, said secondary windings connected in parallel acting as automatic starter.

4. An asynchronous motor, comprising a primary winding, a compensating winding, said primary and compensating winding mounted upon one of the two relatively movable members of the motor, secondary windings mounted upon the other member of the motor, said secondary windings consisting of two wound windings connected in parallel, and wound in different numbers of slots to provide different values of impedance, a commutator connected to said compensating winding, and brushes upon said commutator connected to said secondary windings, said secondary windings acting as automatic starter.

5. An automatically starting asynchronous machine, comprising a primary winding, a compensating winding, said primary and compensating windings mounted upon one of the two relatively movable members of the machine, secondary windings mounted upon the other member of the machine including a short circuited squirrel cage and a phase winding, said squirrel cage winding having its conductors made of magnetic metal and being located in the same slots as but nearer to the air-gap than said phase winding, with close magnetic coupling between said secondary windings, a commutator connected to said compensating winding, and brushes upon said commutator connected to said secondary phase winding.

6. An automatically starting asynchronous machine, adapted to operate as a motor in one direction of rotation and as a generator in the opposite direction of rotation, comprising a primary winding, a compensating winding, said primary and compensating windings mounted upon one of the two relatively movable members of the machine, secondary windings mounted upon the other member of the machine including a short circuited squirrel cage having its conductors made of magnetic metal, said secondary windings being located in the same slots upon said other member of the machine, a commutator connected to said compensating winding, brushes upon said commutator connected to said secondary phase winding, and means for reversing the ends of said secondary phase winding connected to said brushes, whereby to change said machine from motor operation in one direction to generator operation in the other direction and vice versa, without shifting the brushes.

In testimony whereof I have affixed my signature.

PIERRE LETRILLIART.